United States Patent
Harpell

[11] Patent Number: 5,971,653
[45] Date of Patent: Oct. 26, 1999

[54] CONNECTOR MEANS FOR ALLOWING RADIAL ADJUSTMENT OF ONE MEMBER RELATIVE TO ANOTHER

[76] Inventor: William Harpell, 2380 Findlay Rd., Joyceville, Canada, K0H 1Y0

[21] Appl. No.: 08/905,994

[22] Filed: Aug. 4, 1997

[51] Int. Cl.[6] .................. A01B 1/22; F16C 11/00
[52] U.S. Cl. .................. 403/97; 294/51; 294/53.5; 294/59; 172/375
[58] Field of Search .................. 294/49, 51, 52, 294/53.5, 57, 59; 16/112; 56/400.04, 400.06; 172/372, 373, 375; 403/92, 93, 96, 97

[56] References Cited

U.S. PATENT DOCUMENTS

| 261,894 | 8/1882 | Albers | 294/53.5 |
|---|---|---|---|
| 308,907 | 12/1884 | Lee | 294/52 |
| 333,173 | 12/1885 | Taylor | 172/372 |
| 729,432 | 5/1903 | Sidway | 403/96 X |
| 975,320 | 11/1910 | Bilsland | 403/97 X |
| 1,362,065 | 12/1920 | Walker | 294/51 X |
| 1,625,081 | 4/1927 | Haas | 172/372 X |
| 2,003,844 | 6/1935 | Tintner | 403/97 |
| 3,006,668 | 10/1961 | Stewart | 403/96 X |
| 3,739,562 | 6/1973 | McNamara | 403/97 X |
| 4,186,905 | 2/1980 | Brudy | 403/97 X |

FOREIGN PATENT DOCUMENTS

| 229480 | 1/1920 | Canada . |
|---|---|---|
| 232912 | 7/1923 | Canada . |
| 237011 | 1/1924 | Canada . |
| 1190784 | 7/1985 | Canada . |

Primary Examiner—Johnny D. Cherry

[57] ABSTRACT

A tool having a tool handle and a tool head. A connecting member is provided on one end of the tool handle, with the axis of the connecting member extending transverse to the tool handle, and a connector is provided on the non-working end of the tool head. The connector cooperates with the connecting member to connect the tool head to the tool handle. Preferably the tool head is detachably connected to the tool handle. The tool head can be adjustably connected to the tool handle to be able to adjust the angle of the tool head to the tool handle.

2 Claims, 11 Drawing Sheets

CONNECTOR MEANS FOR ALLOWING RADIAL ADJUSTMENT OF ONE MEMBER RELATIVE TO ANOTHER

BACKGROUND OF THE INVENTION

1. Field of the Invention

This invention is directed toward improved tools and improved tool parts.

This invention is more particularly directed toward a new tool handle, and to a tool incorporating the handle.

The invention is also more particularly directed toward a new tool head, and to a tool incorporating the new tool head.

The invention is also particularly directed toward a new tool incorporating both the new tool handle and the new tool head. In a preferred embodiment, the tool head is adjustable relative to the tool handle to allow the tool to perform different functions depending on the position of the head.

The invention is further particularly directed toward a new tool kit incorporating the new tool handle and at least two new tool heads.

The invention is further more particularly directed toward new attachments and adapters for use with the new tools, tool handles and/or tool heads.

2. Description of the Related Art including Information Disclosed Under CFR §§ 1.97–1.99

People buying tools purchase a single tool for each job required. For example, a gardener will purchase a spade for turning the soil, a rake for raking the soil and a hoe for hoeing the soil. Each tool is specifically designed for one function or job. The tool cannot be changed to perform different tasks. Thus, it is relatively expensive to have a different tool on hand for each job. Also, if one part of the tool breaks, the whole tool is often replaced adding to the expense. Having a large number of tools, one for each job, also requires a large amount of storage space for the tools. The known tools are also designed for use by one person. They cannot be combined or modified for use by more than one person.

SUMMARY OF THE INVENTION

It is the purpose of the present invention to provide an improved tool having a detachable tool head so that a broken part of the tool can be easily replaced. It is another purpose of the present invention to provide improved tools that can do more than one job and thus are more versatile. It is another purpose of the present invention to provide improved tool parts that form tools or tool kits that can do more than job. It is a further purpose of the present invention to provide fewer improved tool parts to form various tools that can do various jobs as compared to the number of tool parts required if a separate tool is provided for each job. It is yet another purpose of the invention to provide tools and tool parts that require less storage space than known tools. It is yet another purpose of the present invention to provide improved tools that are more efficient and to provide improved parts for tools that make the tools more efficient. It is yet another purpose of the present invention to provide tool parts which make the cost of all the tools they can form cheaper than the cost of individual tools needed for each job. It is a further purpose of the present invention to provide an improved tool that can be easily modified, or combined with another tool, to be used by two or more people working in unison to increase the efficiency of the tool. It is a further purpose of the present invention to provide an improved tool having a detachable head on a handle with the tool performing one function with the head attached to the handle and a second function with the head detached from the handle.

In accordance with one embodiment of the present invention there is provided an improved tool handle that can be interchangeably used with various tool heads to provide different tools for doing different jobs. In accordance with another embodiment of the present invention there is provided an improved tool head that can be detachably mounted on an improved tool handle. Another embodiment of the invention provides an improved tool having the improved tool handle and the improved tool head detachably connected to it. A further embodiment of the invention provides a tool kit having the improved tool handle and at least two improved tool heads either of which can be detachably connected to the handle to provide an improved tool. Various improved tool heads can be provided in the kit, each head doing one specific job. For example, the kit could have an improved short handle with a pointed spade head; a separate, square spade head; a separate, snow shovel head; a separate, ice pick head; and a separate, snow scoop head. A homeowner would put the tool head required to suit the job on the handle. The tool heads take up less space than the old tools, each of which had a handle, and the tools formed are less expensive. If a new tool is needed, the homeowner only has to purchase the tool head.

In another embodiment of the present invention there is provided a tool having the improved tool handle and at least one of the improved tool heads with means for adjustably mounting the tool head on the tool handle to vary the angle of the tool head to the tool handle depending on the job required. For example, a snow scoop tool head could be used to pull snow with the blade of the scoop in one position on the handle or to push snow with the blade in another position on the handle. As another example, a square spade tool head could be mounted on the handle in one position, generally aligned with the handle, for turning earth or in a second position, an angle to the handle, so that it could be used as a hoe. Thus the tool, comprising the improved tool handle and one of the adjustable tool heads, is very versatile. All of the improved tool heads could be made adjustable, if desired, in order to adjust the angle of each tool head relative to the handle and thus provide even greater versatility.

The improved handle, head, or tool could be provided with various attachments or adapters which makes the tool much more efficient. For example, if the improved tool head is a snow scoop, a detachable end plate could be provided to increase the capacity of the scoop. The snow scoop could also be provided with a detachable edge guard to protect outdoor carpets when shoveling snow. The tool incorporating the snow scoop could be provided with means for detachably connecting it to another similar tool with a snow scoop to form a snow plow having two parallel handles. This snow plow could be used by one or two people. Attachment means in the form of additional handles can be provided for the plow. Adapters could be provided for extending the handle of the tool, or for providing a joint in the handle which allows articulation of the handle to place the tool head in the best possible working position.

In another embodiment, a tool is provided with a tool head having two different tool implements so that the tool head can be used with one handle for two different jobs. The tool can have the handle mounted in various radial positions relative to the tool head. The tool head can have limited rotational movement relative to the handle when the handle is in one of the radial positions so as to be able to rock the tool head when using it. The tool head can be detachably mounted to the handle. The tool head can also be provided with means permitting it to be detached from the handle and used for a different job than the job it is used for when attached to the handle. For example, a tool head can be provided with means for raking leaves. The tool head can be removed from the handle and used instead for picking up the leaves.

The invention, in one embodiment, is particularly directed toward a tool handle having a shaft and connecting means at one end of the shaft for use in detachably connecting the tool handle to a tool head. The axis of the connecting means extends transversely to the shaft and the connecting means is adapted to receive connector means on one end of a tool head to detachably connect the tool head to the tool handle.

The invention is further particularly directed toward a tool head having a tool implement and connector means at the non-working end of the tool implement for use in detachably connecting the tool head to a tool handle. The connector means is supported from the non-working end of the tool implement generally in the plane of the tool implement and extending transversely to the longitudinal axis of the tool implement.

The invention is also particularly directed toward a tool having a tool handle and a tool head. The tool handle has a shaft and connecting means at one end of the shaft for use in detachably connecting it to the tool head. The axis of the connecting means extends transverse to the shaft. The tool head has a tool implement and connector means at the non-working end of the tool implement for cooperating with the connecting means on the tool handle to detachably connect the tool head to the tool handle. Preferably, the angle of the tool head can be adjusted relative to the tool handle allowing the tool head to perform different functions.

DESCRIPTION OF THE PREFERRED EMBODIMENTS

Figures 1, 2, 3, 4:
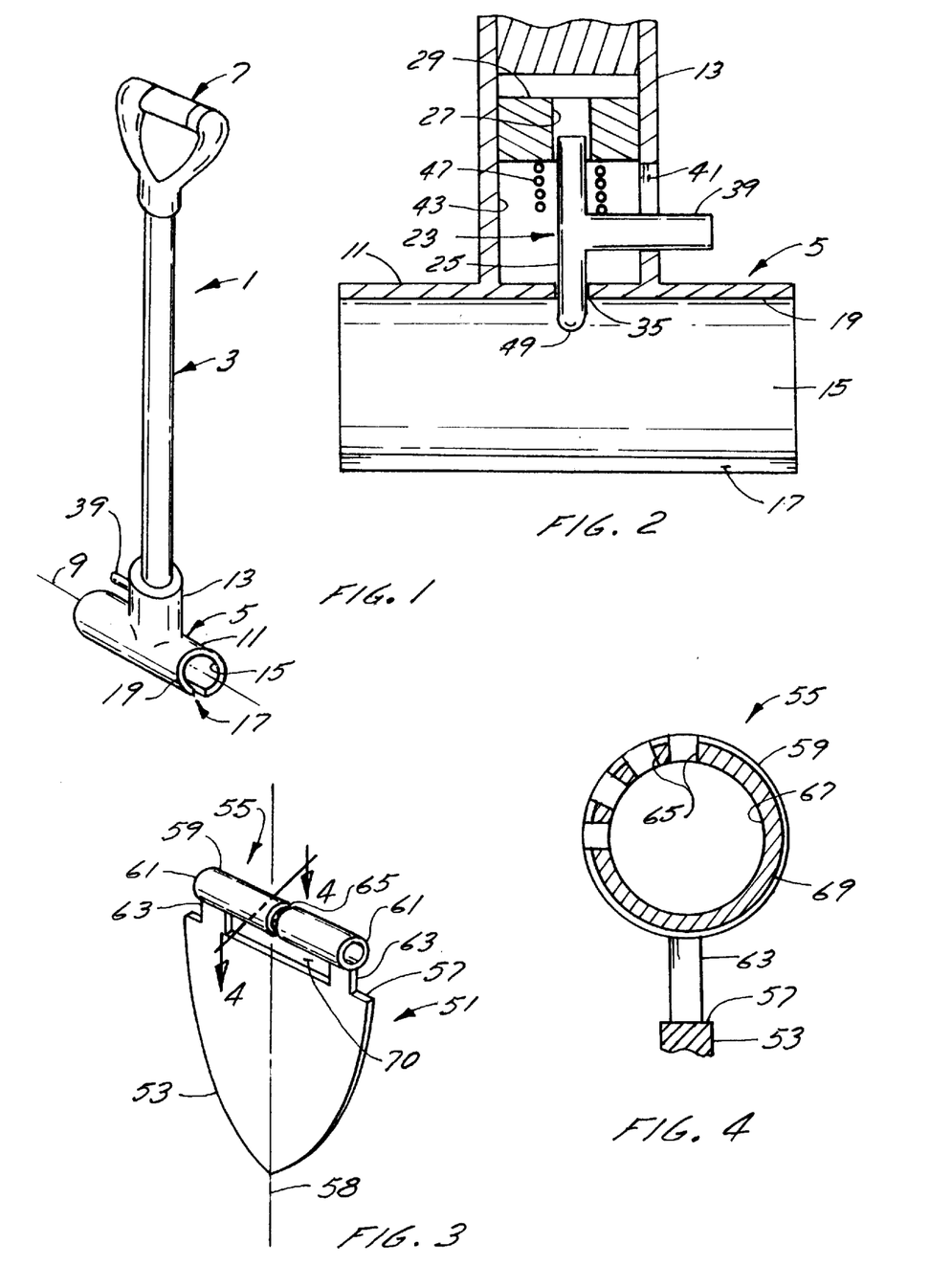
FIG. 1 is a perspective view of a tool handle of the present invention.
FIG. 2 is a longitudinal, cross-sectional view of the connecting means on the tool handle.
FIG. 3 is a perspective view of a tool head usable with the tool handle.
FIG. 4 is a cross-section view taken along line 4—4 of FIG. 3.

The tool handle 1 of the present invention, as shown in FIGS. 1 and 2, has a shaft 3 and connecting means 5 at one end of the shaft 3. A hand grip 7 can be provided at the other end of the shaft 3. The hand grip 7 can be detachably mounted on the other end of the shaft by suitable means (not shown). The axis 9 of the connecting means 5 extends transversely to the shaft 3. The connecting means 5 preferably comprises a tubular member 11 at one end of a transverse collar 13, the collar and tubular member forming a tee. The collar 13 is adapted to be mounted on the one end of the shaft 3 by means of a fastener (not shown) or other suitable means. The tubular member 11 preferably has a cylindrical bore 15 along the axis 9 and there is a longitudinal slot 17 through the wall 19 of the member, opposite the collar 13.

Locking means 23 are provided on the connecting means 5 as shown in FIG. 2. The locking means 23 preferably comprise a pin 25 slidably mounted through a central bore 27 in a block 29 within the collar 13. The pin 25 extends from the block 29 through an opening 35 in the wall 19 of the tubular member 11 into the bore 15. A handle 39 extends laterally from the pin 25 through a slot 41 in the wall 43 of the collar 13. A spring 47 is mounted between the handle 39 and the block 29 and serves to bias the round end 49 of the pin 25 into the bore 15.

While the locking means 23 has been described in the form of a pin 25, it could also be in the form of a flat finger. The flat finger would protrude through a slot in the wall 19 of the tubular member 5 which slot would replace the opening 35. The flat finger would still be provided with a handle similar to handle 39 and suitable spring means would bias the finger through the slot in the wall 19.

The locking means are shown on the bottom end of the shaft 3 at the connecting means 5. However, the pin 25 of the locking means could extend up through a central bore in the shaft 3 to the top end of the shaft or to the hand grip 7, and the handle 39 on the pin 25 could be located at the top end of the shaft or on the hand grip 7 instead of adjacent the connecting means 5. A suitable slot would be provided in the top of the shaft 3 or the hand grip 7, similar to slot 41, for the new location of the handle. Means would be provided at the lower end of the pin 25, to replace the bottom handle 39, to maintain the spring 47 in place. These replacement means would be a short pin or a similar member.

While the tool handle 1 has been described as one having a hand grip 7 at one end of the shaft, the handle can also be provided without a hand grip. Such a handle is normally longer than the handle with a hand grip, and is used with garden rakes and hoes by way of example. The shorter handle with a hand grip is normally used with shovels by way of example.

The tool head 51 of the present invention, as shown in FIGS. 3 and 4, has an implement 53 such as a pointed shovel blade, with connector means 55 at the upper end 57 of the implement 53. The connector means 55 lies generally in the plane of the implement 53 and is transverse to its longitudinal axis 58. The connector means 55 preferably comprises a tubular member 59 attached at its ends 61 to the upper end 57 of the implement 53 by short arms 63. The arms 63 are spaced apart a distance slightly greater than the length of the tubular member 11 on the handle 1. The tubular member 59 is centrally located on the upper end 57 of the implement 53 and is sized to fit snugly within the tubular member 11 on the connecting means 5 on the handle 1. The tubular member 59 has a series of holes 65 through its wall 67. The holes 65 are located centrally of the member 59 along a circumferential line about the member and are spaced apart from each other in the circumferential direction. A shallow, circumferential locating groove 69 may be provided on the outer surface of wall 67 passing through the holes 65.

Figure 5:
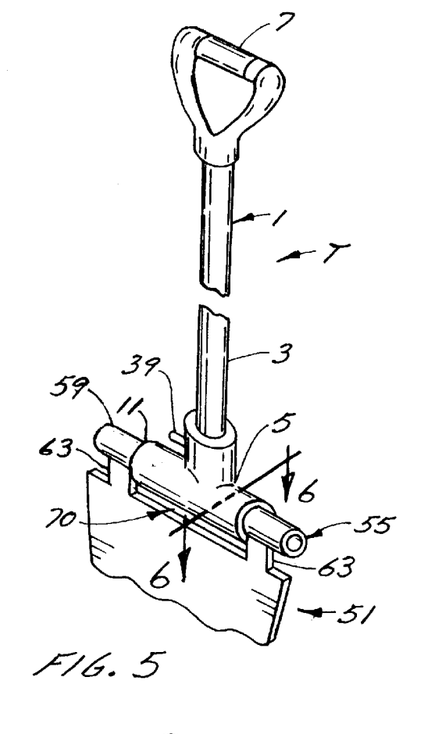
FIG. 5 is a perspective view of the tool assembled from the tool handle and tool head.
Figure 6:
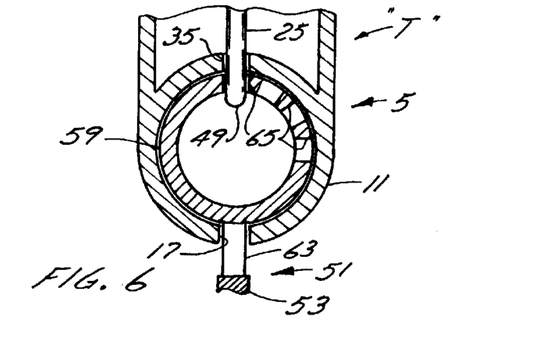
FIG. 6 is a cross-section view taken along line 6—6 of FIG. 5.
Figure 7:
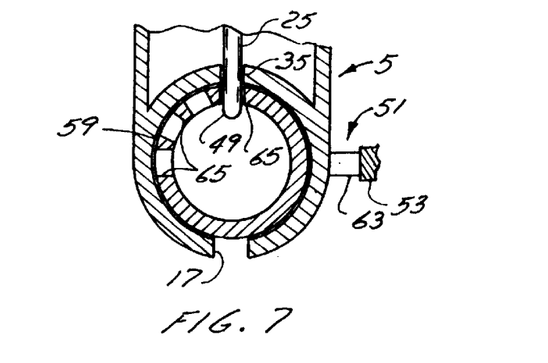
FIG. 7 is a cross-section view similar to FIG. 6 but with the tool head adjusted relative to the handle.

The tool "T", shown in FIGS. 5 and 6, is assembled by sliding the tubular member 59 of the connector means 55 on the tool head 51 into the connecting member 11 of the connecting means 5 on the tool handle 1 while the handle 39 is manipulated to raise the pin 25. The first arm 63 on the tool head 51 passes through the longitudinal slot 17 on the connecting member 11. Once the tubular member 59 slides past the pin 25, the pin is released and the tool head 51 is moved until its tubular member 59 is generally centered with respect to the connecting member 11. In this position, the connecting member 11 is located between the arms 59. The tool head 51 is now adjusted until the free end 49 of the pin 25 enters the hole 65 selected for the tool head position desired. The pin 25 locks the tool head 51 in the selected position. For example, if the tool is to be used with the blade 53 extending straight down from the handle 1, so as to form a shovel, the tool head 51 is positioned to have the pin 25 enter the hole 65 diametrically opposed to the blade 53 as shown in FIG. 6. If the tool is to be used with the blade 53 at a right angle to the handle 1, as shown in FIG. 7, to form a hoe, the tool head 51 is positioned to have the pin 25 enter the tool hole 65 that is at a right angle to the plane of the blade 53. The tool head 51 is free to rotate about the connecting member 11 in repositioning it because of the gap 70 between the tubular member 59 and the blade 53 between the arms 63. The pin 25 on the connecting means 5 and the holes 65 on the connector means 55 form cooperating means allowing the handle 1 of the tool to be positioned at one of several radial positions relative to the tool head 51.

Figure 8A:
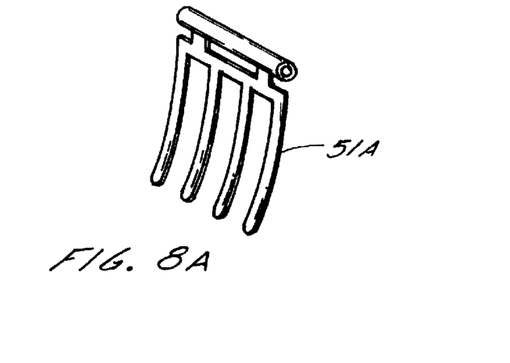
FIGS. 8A and 8B are perspective views of some of the other tool heads that can be used with the tool handle.
Figure 8B:
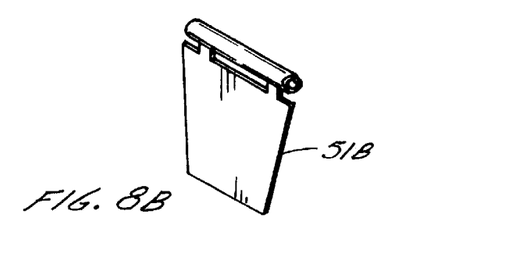

The tool head 51 can be easily replaced by another tool head. The tool head 51 is removed by lifting the pin 25 via its handle 39, rotating the tool head 51 relative to the handle 1 to align the arms 49 on the tool head 51 with the slot 17 on the handle 1 and sliding the tool head 51 off the handle 1. A new tool head, such as fork tool head 51A, shown in FIG. 8A, or a square-bladed shovel tool head 51B, as shown in FIG. 8B, is slid in place on the handle 1 with the pin 25 raised and then locked in place by releasing the pin 25 to enter a selected hole on the new tool head.

If the locking pin 25 is replaced with a flat finger, the holes 65 in the tool head are replaced by slots to receive the end of the flat finger.

It will be seen that the tool of this invention permits many tool heads to be used with only one handle. In addition each tool head can be used in several positions on the handle, depending on the desired use of the tool head, providing added versatility for the tool.

Figure 9:
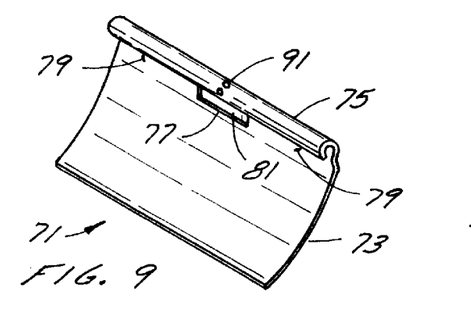
FIG. 9 is a perspective view of a snow scoop tool head.
Figure 10:
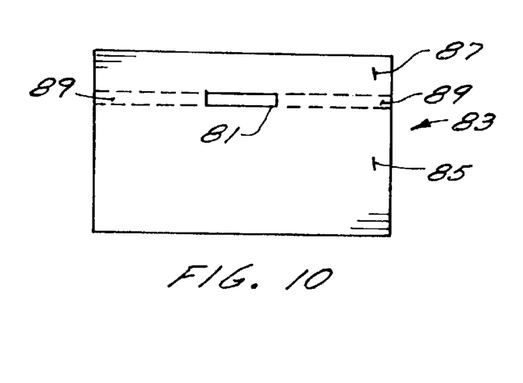
FIG. 10 is a plan view of a piece of material that can be used to make the snow scoop shown in FIG. 9.

In one embodiment of the invention, the tool head can be a snow scoop tool head 71 as shown in FIG. 9. The snow scoop tool head 71 has a relatively wide, curved, blade 73 with a tubular connecting member 75 attached to the top edge 77 of the blade 73 with a pair of wide, spaced-apart arms 79. A narrow gap 81 is provided between the blade 73 and the connecting member 75 between the arms 79. Preferably the blade 73, the arms 79 and the connecting member 75 are made from a single piece of metal 83, as shown in FIG. 10, with the gap 81 stamped out to form a large piece 85 and a small piece 87 joined by wide connectors 89. The small piece 87 is rolled to form the tubular connecting member 75. The large piece 85 is bent to from the curved blade 73. The connectors 89 between the pieces 85 and 87 form the arms 79 with the gap 81 between them. The connecting member 75 in this embodiment extends across the width of the blade 73. The connecting member 75 is provided with a set of drilled holes 91 arranged on a circumferential line centrally of the member.

Figure 11:
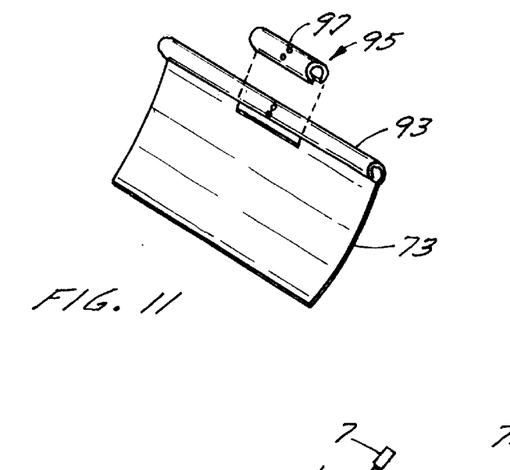
FIG. 11 is a perspective, exploded view of a modified snow scoop.

Since the blade 73 is relatively thin, the connecting member will also be relatively thin and may not in some cases be sturdy enough to support the handle 1. It is therefore preferred that the small section 87 be rolled into a tube 93, as shown in FIG. 11, that is smaller than the tubular connector on the handle. This tube provides rigidity to the blade 73. A collar or sleeve 95 of heavier material is formed about the central portion of the tube 93 to form the connecting member for connecting the scoop to the handle. The sleeve 95 is split so that it can be formed about the tube 93. A set of drilled holes 97 are provided in the sleeve 95 about a circumferential line centrally of the sleeve which in turn is centrally located on the tube 93. The sleeve is formed tight enough about the tube so that it will not slide along the tube. Alternatively, it can be attached to the tube with suitable fastener means, not shown.

Figures 12A, 12B, 12C:
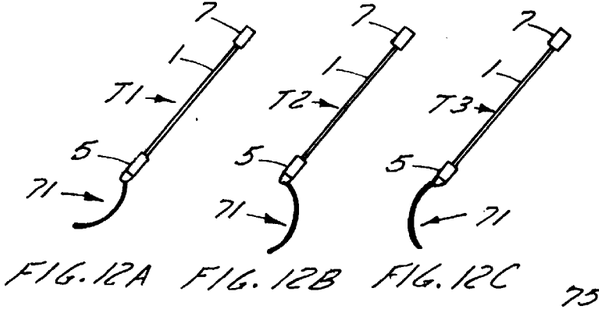
FIGS. 12A, 12B and 12C are elevation views of the snow scoop with the blade tool head in different positions relative to the handle.

The snow scoop tool head 71 is used with a handle 1 to form a snow shovel. In one position of the tool head 71 on the handle, with the curved blade generally aligned with the handle 1, the tool "T1" can be used as a snow shovel as shown in FIG. 12a to lift and throw snow. In another position of the tool head 71, with the curved blade angled downwardly from the handle and the curve opening out away from the handle 1 as shown in FIG. 12b, the tool "T2" can be used as a snow scoop to plow and push the snow in front of it. In yet another position of the tool head 71, with the blade at an angle to the handle and with the blade curve opening toward the handle, as shown in FIG. 12c, the tool "T3" can be used as a snow puller to pull the snow toward the operator to clear the snow.

Figure 13:
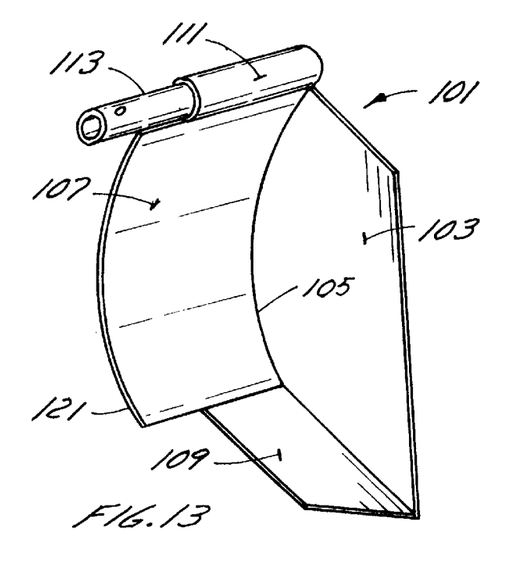
FIG. 13 is a perspective view of an end wall attachment for the snow scoop tool head.
Figure 14:
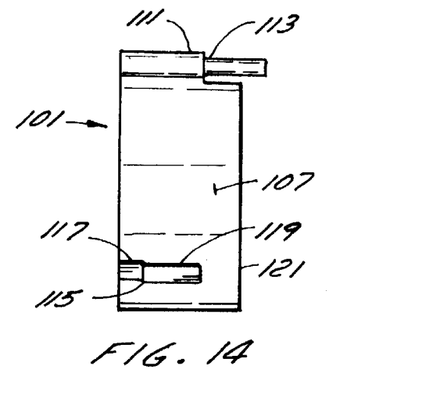
FIG. 14 is a rear view of the end wall attachment.

The snow scoop tool head 71 can be provided with an attachment 101 that forms an end wall on one end of the scoop. The end wall attachment 101, as shown in FIGS. 13 and 14, comprises a flat end wall 103 having a curved edge 105 that follows the curvature of the blade 73 of the scoop. A short, curved, side wall 107 extends laterally from the edge 105 of the end wall 103. A short, narrow bottom wall 109 extends between the end wall 103 and the side wall 107 to provide rigidity. The bottom wall 109 also acts as a sliding shoe for the plow when the attachment is mounted on the plow. Means are provided for detachably connecting the end wall attachment to the scoop. To this end, the upper portion 111 of the side wall 107 is curved about, and fastened, to a tube 113 with the tube projecting inwardly past the side wall 107. A clip 115 is fastened at one end 117 to the back of the side wall 107 near its bottom end and adjacent the end wall 103. The clip 115 extends parallel to the tube 113 and its free end 119, near the inner edge 121 of the side wall 107, is spaced slightly from the side wall 107.

Figure 15:
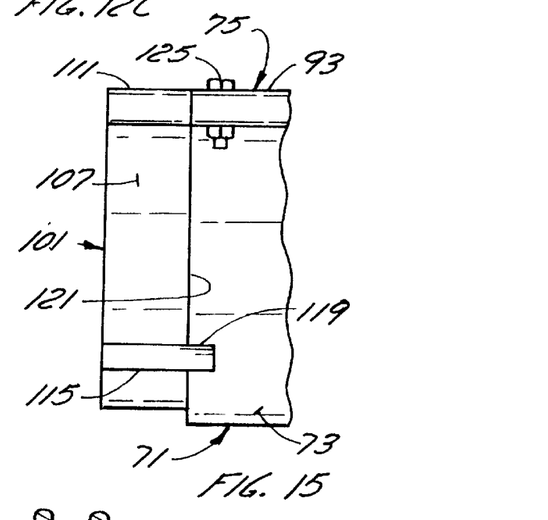
FIG. 15 is a rear view of the attachment installed on the blade of the snow scoop.

The end wall attachment 101 is mounted on one end of the blade 73, as shown in FIG. 15, by sliding the tube 113 into the rolled tube 93 on the top of the blade 73 and by gripping the lower part of the blade 73 between the clip 115 and the side wall 107. The side wall 107 rests inside of the blade 73. A bolt 125 passing through aligned holes in the rolled tube 93 and the tube 113 can be used to hold the attachment in place. If desired, two such attachments 101 can be provided, one for each end of the scoop. The attachment allows the scoop to handle more snow and also to direct the snow to one side or the other if the scoop is provided with only one attachment and is used as a plow.

Figure 16:
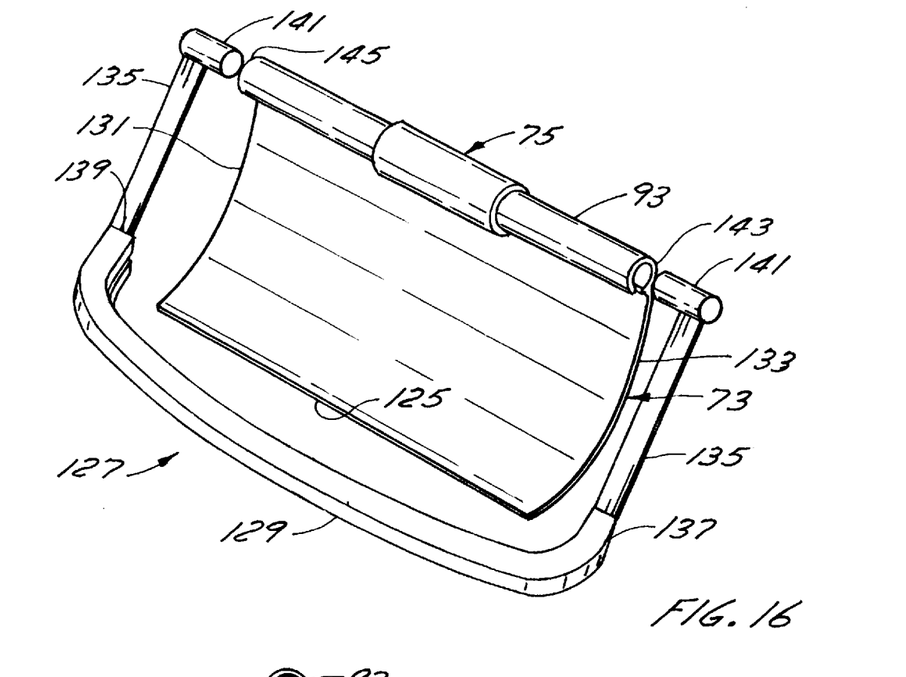
FIG. 16 is an exploded, perspective view of an edge guard attachment for the snow scoop tool head.
Figure 17:
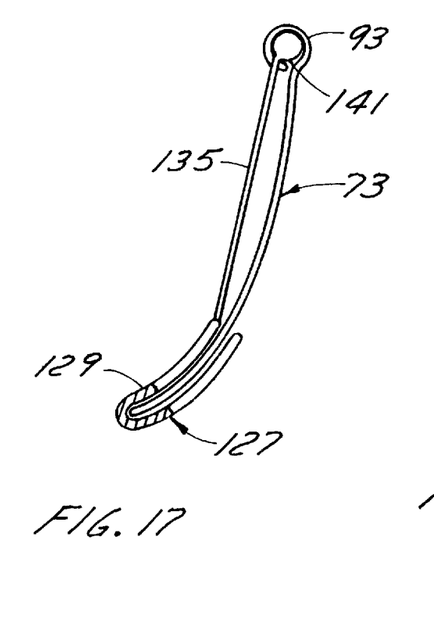
FIG. 17 is a cross section view of the edge guard installed.
Figure 17A:
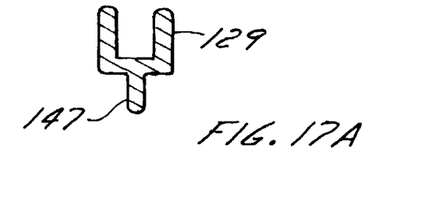
FIG. 17A is a cross-section view of a modified edge guard.

The snow scoop tool head 71 can be provided with another attachment that prevents the edge 125 of the blade 73 from scratching or cutting surfaces, such as outdoor carpeting by way of example, when they are being cleaned of snow. This edge attachment 127, as shown in FIGS. 16 and 17, comprises a blade edge cover 129 in the form of a rubber or plastic unshaped channel sized to snugly receive the edge 125 of the blade 73 and long enough to extend along the edge 125 of the blade and at least part way up the sides 131, 133 of the blade. Means are provided for detachably connecting the cover 129 to the blade when it is mounted on the edge 125 and the sides 131, 133. The connecting means can comprise a strap 135 at each end 137, 139 of the cover 129 extending up to the tube 93 at the top of the blade 73. A plug 141 at the end of each strap 135 fits snugly in the ends 143, 145 of the tube 93 to securely hold the cover 129 on the edge 125 of the blade 73. The straps 135 and the plugs 141 can be molded integrally with the cover 129. Other suitable means can be used to fasten the cover onto the blade. The cover can be easily removed when not needed. The cover 129 prevents the blade from scratching or tearing any surface when it is being used. The cover 129 can be provided with a flange 147 as shown in FIG. 17A on its side opposite the side having the channel. The flange permits the snow scoop, equipped with the cover, to act as a squeegee to push water off surfaces.

Figure 18:
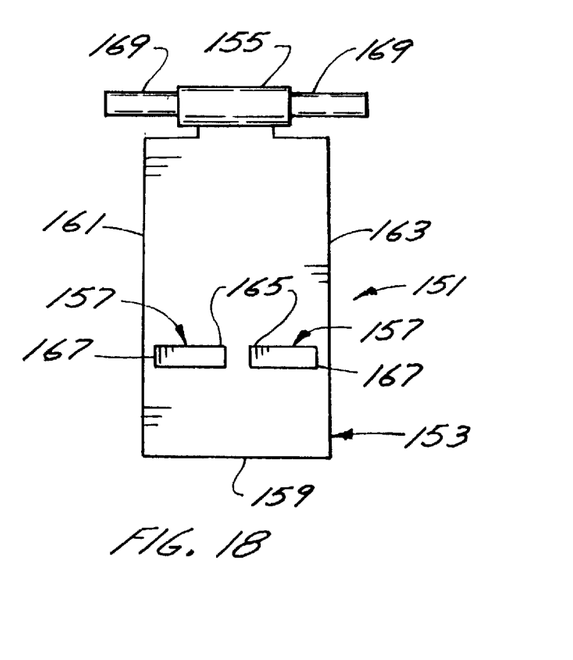
FIG. 18 is a rear view of a connector attachment used to join two snow scoops to form a plow.

The snow scoop tool head 71 can be provided with a further attachment 151 allowing the snow scoop 71 to be used with a second snow scoop 71' to form a plow. The connector attachment 151, as shown in FIG. 18, comprises a rectangular or square plate 153 having the same curvature as the scoop blade 73. The top part of the plate is cut back and the cut back part is preferably rolled to form a tube 155. Means are provided on the plate 153 for detachably connecting it to the two snow scoops 71, 71' to join them end-to-end. The connecting means can comprise locking fingers 157 attached to the back of the plate 153 near its bottom edge 159, one finger adjacent each side edge 161, 163 of the plate. The fingers 157 extend parallel to the bottom edge 159 of the plate 153, and are slightly springy. The fingers 157 are attached at one end 165 to the back of the plate and lie parallel to the plate with their free end 167 near the side edges 161, 163. A mounting tube 169 is fastened in each end of the tube 155 on top of the plate 153, the mounting tubes 169 projecting past the side edges 161, 163 of the plate.

Figure 19:
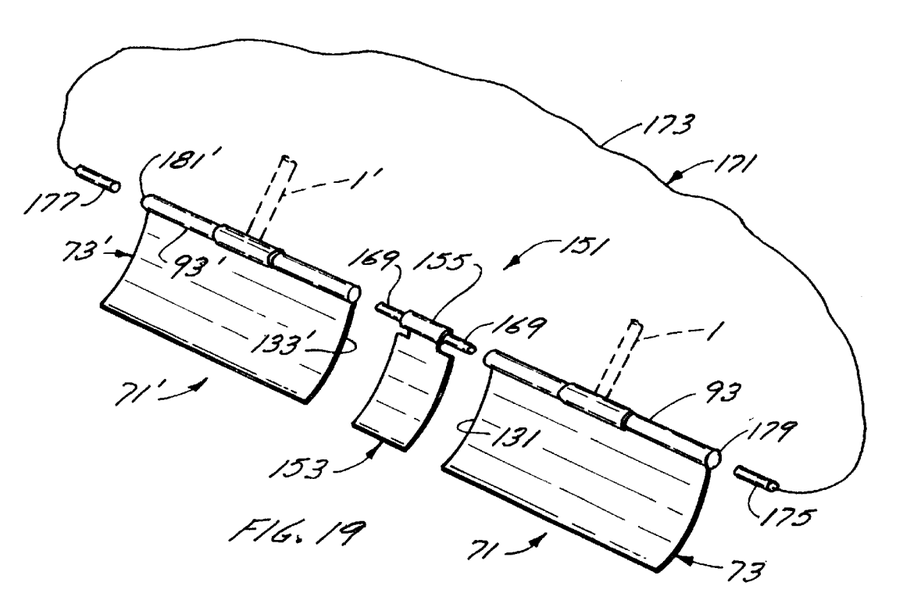
FIG. 19 is an exploded view of the plow.
Figure 20:
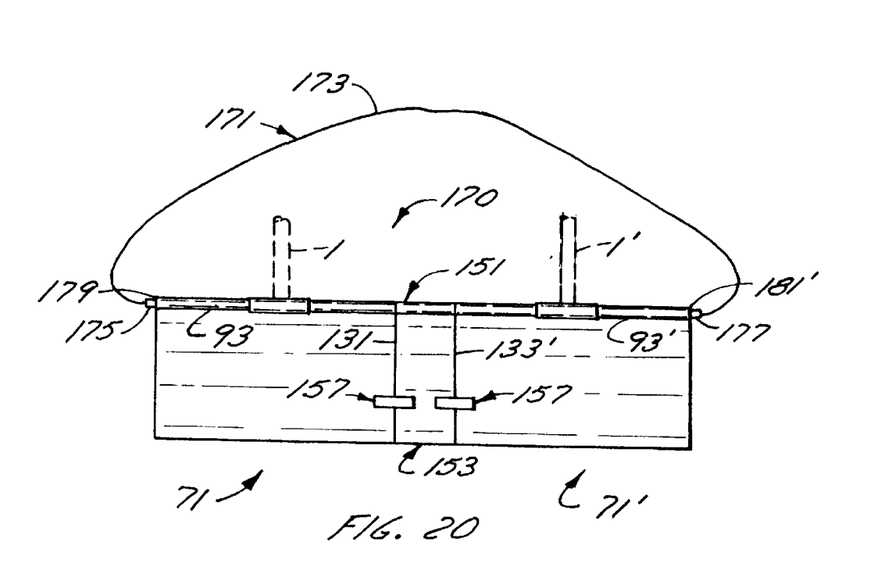
FIG. 20 is a rear view of the plow.

The connector attachment 151 is used to join two snow scoops 71, 71" side-by-side to form a plow 170 as shown in FIGS. 19 and 20. One side of the plate 153 is attached, via one finger 157 and one tube 169, to one side 131 of one scoop 71. The other side of the plate 153 is attached, via the other finger 157 and tube 169, to the other side 133' of the other scoop 71' joining the scoops in side-by-side relationship with their blades 73, 73' aligned. The two handles 1, 1' of the two scoops form the operating handles of the plow 170. The plow can handle twice as much snow as a single scoop. The plow could be used by one or two people. More than two snow scoops 71 could be joined side-by-side to form larger plows.

If desired, pulling means 171 can be provided for pulling the plow. The pulling means 171, as shown in FIGS. 19 and 20, can comprise a rope 173 or similar flexible member having a plug connector 175, 177 at each end. One plug 175 slides snugly into the outer end 179 of the rolled tube 93 at the top of one scoop 71 forming part of the plow and the other plug 177 slides snugly into the outer end 181' of the rolled tube 93' at the top of the other scoop 71' forming the other part of the plow. While a first person manipulates the plow by the handles, pushing snow in front of him, a second person, in front of the plow, helps to move the snow pushed by the plow by pulling on the plow through the pulling means 171.

Figure 20A:
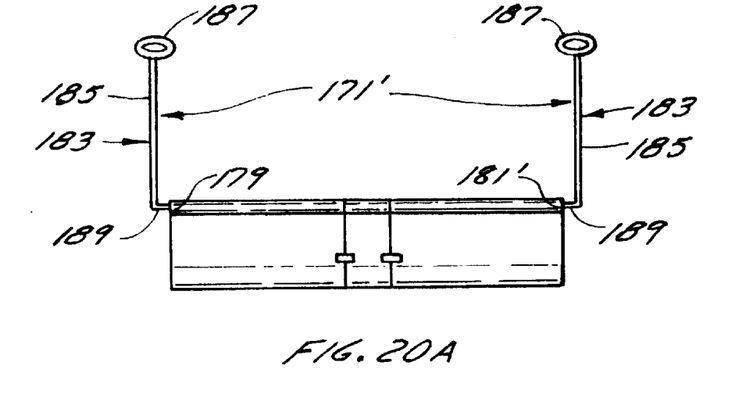
FIG. 20A is a rear view of the plow showing modified handles used with the plow.

Alternatively, as shown in FIG. 20A, the pulling means 171' could comprise a pair of rigid handles 183, each handle 183 having a rigid shaft 185 with a hand grip 187 at one end and a plug 189 at the other end extending transversely to the shaft 185. The plugs 189 fit snugly into the ends 179, 181' of the tubes 93, 93' on the scoops. One or two people can pull on the handles 183 to help the pusher move snow with the plow.

Figure 21:
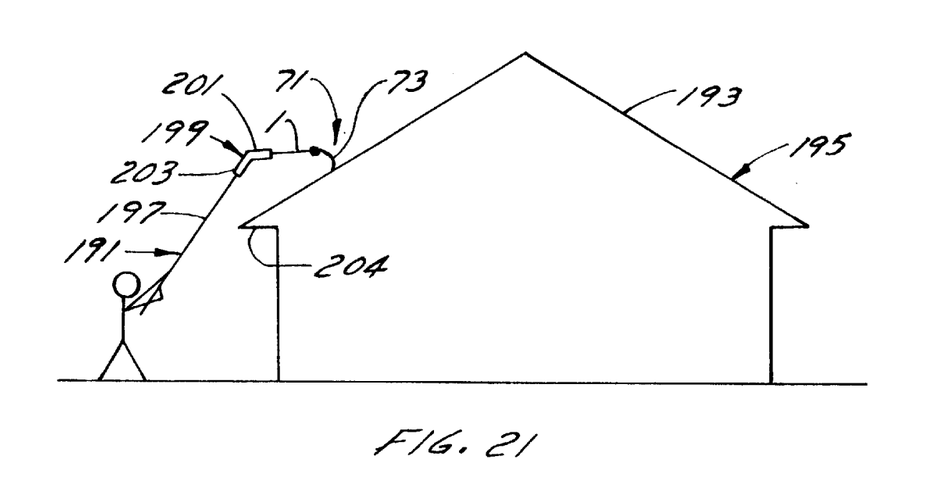
FIG. 21 is an elevation view of an extension kit in use.
Figure 22:
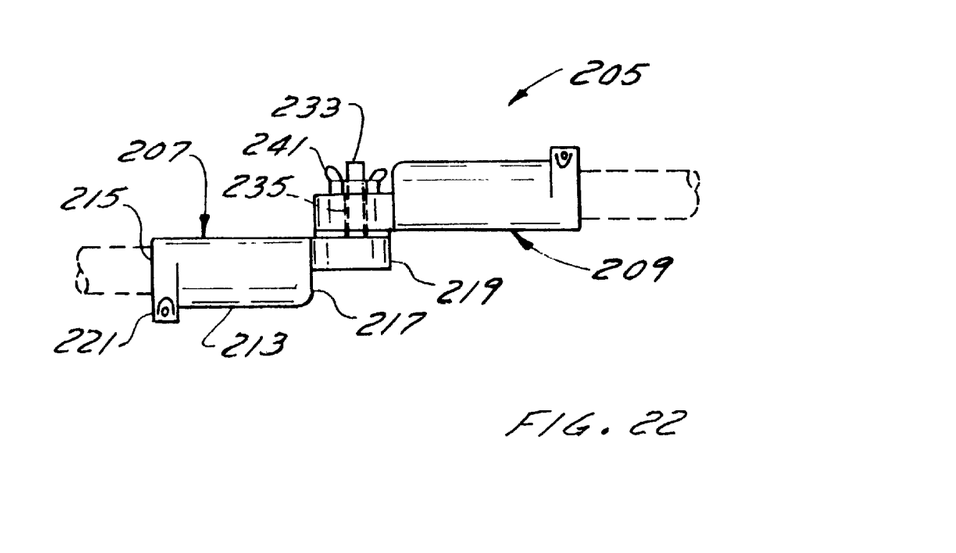
FIG. 22 is a side view of an adjustable angle connector.
Figure 23:
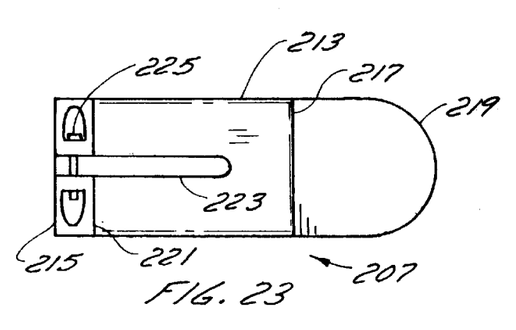
FIG. 23 is a top view of one part of the adjustable angle connector.
Figure 24:
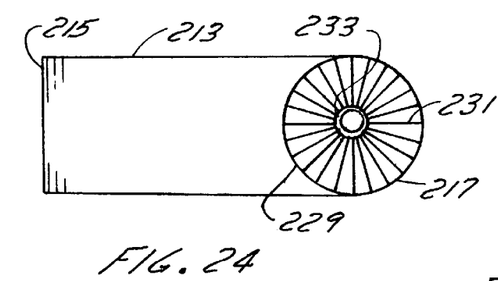
FIG. 24 is a bottom view of the one part shown in FIG. 23.
Figure 25:
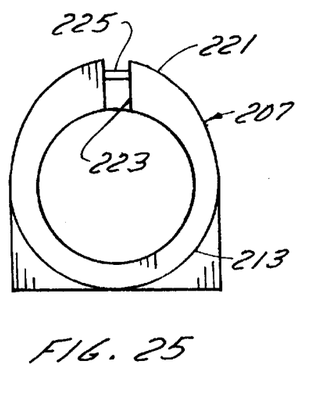
FIG. 25 is an end view of the one part shown in FIG. 23.

In another embodiment, an extension kit 191 is provided for use in using a snow scoop to clear snow off the roof 193 of a house 195 as shown in FIG. 21. In this embodiment, the handle 1 on the snow scoop 71 is provided with a removable grip. The extension kit 191 has a long, straight, extension handle 197 and a fixed-angle connector fitting 199. The fitting 199 can be detachably connected at one end to one end of the extension handle 197 and at its other end it is detachably connected to the free end of the handle 1. The arms 201, 203 of the connector fitting 199 are at an angle of about one hundred and thirty five degrees. When the extension kit 191 is used with a scoop 71 having a handle 1 and with the scoop blade 73 in a pulling position, as shown in FIGS. 12C and 21, and with the angle between the arms 201, 203 of the fitting in a vertical plane, the tool can be used to pull snow off the roof of a building. The angled fitting 199 allows the operator to stand close to the building while still clearing the eaves 204 of the building.

The angled fitting 199 can also be mounted on the handle 1 adjacent the tool head carried by the handle. The fitting 199, when used with the angle between the arms in a generally horizontal plane, allows the tool head, such as a plow head, to be angled relative to the handle. Preferably, means, such as connecting means on the fitting and connector means on the tool head, are provided for detachably connecting the tool head to the fitting, and thus to the handle. The connecting means are similar to the connecting means 5 and the connector means are similar to the connector means 55.

In another embodiment, as shown in FIGS. 22 to 25, an adjustable angle connector fitting 205 is provided for use with extension handles and tools. The fitting 205 has two sections 207, 209 rotatably connected together by a pivot pin. The sections 207, 209 are nearly identical in construction so only one will be described in detail. The one section 207 has a tubular part 213 with an open mouth 215 at one end for receiving one end of a tool handle or a handle extension. The other end 217 of the tubular part 213 is closed. The section 207 has a flat part 219 adjacent the closed end 217 of the tubular part 213. The tubular part 213 has a raised rim 221 around a portion of the mouth 215. The tubular part 213 has a relatively long slot 223 extending inwardly from the mouth 215 through the rim 221. A bolt 225 is threaded through the rim 221, across the slot 223, adjacent the mouth of the tubular part 213. When the bolt 225 is tightened, it draws the tubular part 213 tight about the handle or handle extension that is mounted within the part. The flat part 219 of the section 207 adjacent the tubular part 213 has a circular connecting area 229 that has radial serrations 231 on it. A threaded pivot pin 233 extends transversely from the center of the connecting area 229 in section 207. A through hole 235 is provided in the center of the connecting area 229 in section 209. The two sections 207, 209 are connected together, with their connecting areas 229 abutting, with the pin 233 passing through the hole 235 and with a wing nut 241 fastened on the pin 233 to hold the sections 207, 209 together.

Figure 26:
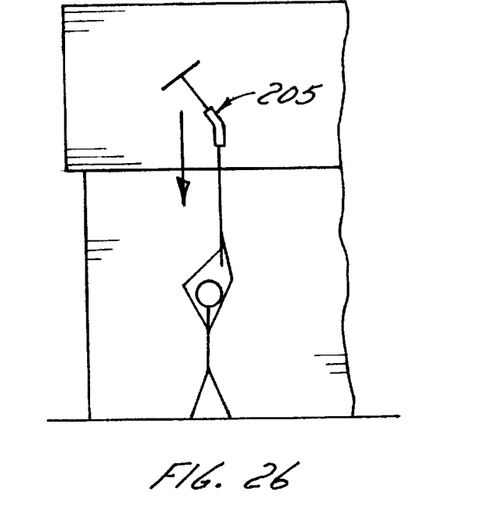
FIG. 26 is an elevation view of the adjustable angle connector being used in one mode of operation.

The fitting 205 is used to connect one end of a tool handle with one end of an extension handle. The tool handle, again without a hand grip, is fixed in the tubular part 213 of one section 207 set before they are connected to the handles. This is done by loosening the wing nut 241 to separate the sections, adjusting their angle about the pivot pin 233, and then tightening the wing nut on the pin to lock their serrated faces together and retain them in the selected angular position. The fitting 205 can be used with the pin 233 in a horizontal position. In this mode, the fitting 205 can be used in the same way as the fitting 199 shown in FIG. 21. The fitting can also be used with the pin 233 vertical. In this arrangement, when the fitting 205 is set at an angle, a snow scoop 71 is used at an angle as shown in FIG. 26, like a plow, thereby making it easier to draw snow off a roof. The fitting 205 can, of course, be used with the axis of the tubular parts of the sections 207, 209 aligned so that the extension handle forms a straight extension of the tool handle. The fitting 205 can also be used at one end of a handle adjacent a tool head, such as a plow, with the pin 233 in a nearly vertical position. The fitting 205 is preferably detachably connected to the tool head with connecting means, similar to connecting means 5, on the fitting instead of the handle, and connector means, similar to connector means 55, on the tool head.

Figures 27, 28:
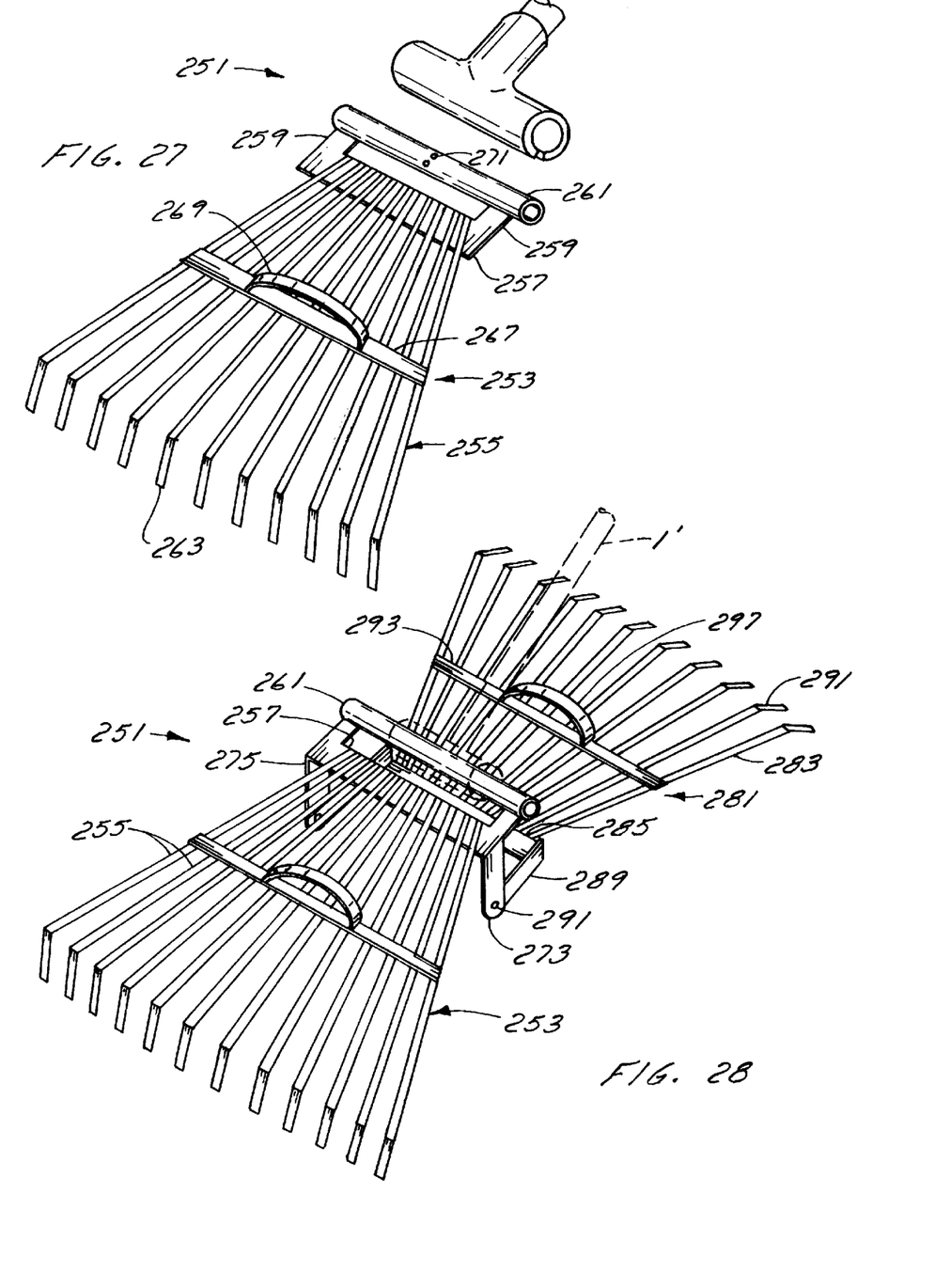
FIG. 27 is a perspective view of a leaf raking tool head.
FIG. 28 is a perspective view of a modified leaf raking head.

In another embodiment, a tool head can be provided with a leaf raking implement. In this embodiment the leaf raking tool head 251, as shown in FIG. 27, has a rake implement 253 with flexible teeth 255 diverging from a narrow base 257 which in turn is connected by arms 259 at its ends to the ends of a tubular connector 261. The free end portions 263 of the teeth 255 are bent inwardly. The end portions 263 can be bent inwardly nearly ninety degrees if desired. The major portion of the teeth 255 could also be bowed outwardly. A strap 267 extends transversely across the back of the teeth 255 around the middle of the teeth. A grip 269 is mounted on the strap 267 for manually handling the rake implement 253 as will be described. The tubular connector 261 has a set of holes 271 about a circumferential line in the center thereof. The rake tool head 251 is adapted to be mounted in the connecting means 5 on a handle 1'. Handle 1' differs from handle 1 only in that it does not have a grip at its free end and it is longer. The rake tool head 251 can be mounted in one of several positions relative to the handle 1' using the holes 271.

The leaf raking tool head 251 can be modified to have a second rake implement 281 associated with it as shown in FIG. 28. The modification involves providing a pair of brackets 273, 275 on the base 257 extending transversely therefrom. The second rake implement 281 is similar to the first rake implement 253 and has flexible teeth 283 diverging away from a u-shaped base 285. The arms 289 of the base 285 are adapted to be connected by suitable pivot means 291 to the top ends of the brackets 273, 275 on the first rake implement. The free end portions 291 of the teeth 283 are bent inwardly. A strap 293 extends transversely across the back of the teeth 283 around their mid point. The strap 293 has a grip 297 for manually handling the rake implement 281 as will be described.

The second rake implement 281 is mounted on the first rake implement 253 while the first rake implement is mounted on the handle 1'. The second rake implement 281 is normally pivoted away from the first rake implement 253, as shown in FIG. 28, against the handle so as to be out of the way of the first rake implement while raking. Suitable means, not shown, will hold the second rake implement 281 against the handle.

Figure 29:
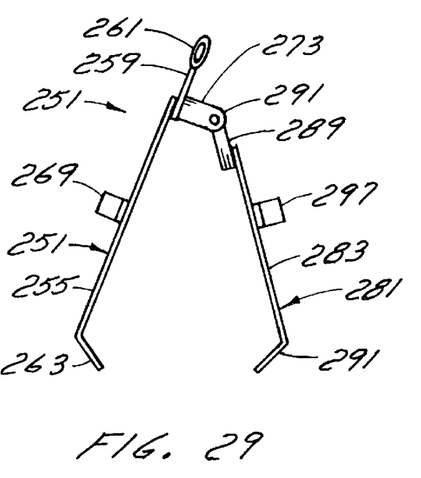
FIG. 29 is an end view of the modified leaf raking head detached from the tool handle.

After raking is completed, the rake tool head 251 can be detached from the handle 1' and the two rake implements 253, 281 manipulated by their grips 269, 297 to face each other, as shown in FIG. 29. The grips are then used to pivot the rake implements apart to open like a clam shell. This allows the rake implements to pick up material, such as a pile of raked leaves, when they are closed toward each other over the material. The rake tool head 251, with the two rake implements 253, 281, could also be modified to be used solely as a material pick-up device. In this modification, no connector means 261 is needed on the tool head.

Figures 30, 32:
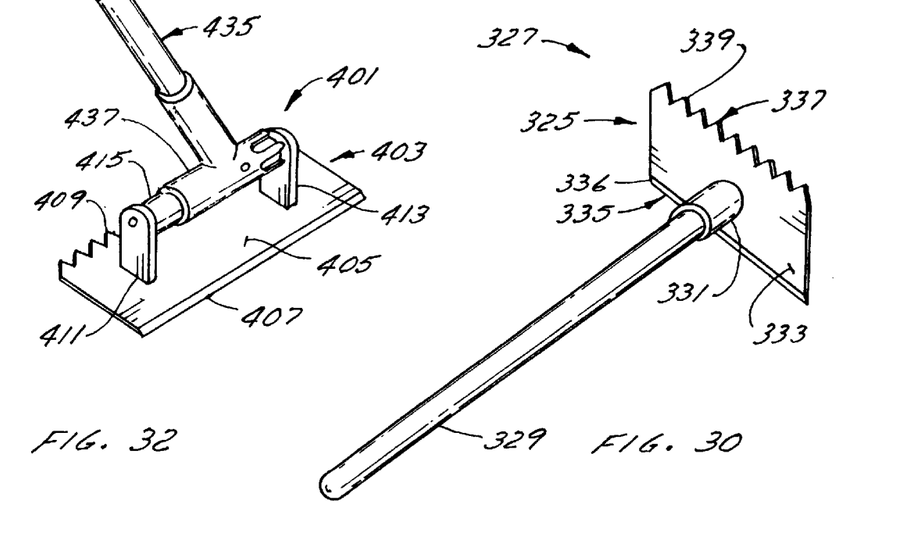
FIG. 30 is a perspective view of a tool head with two tool implements on the head.
FIG. 32 is a perspective view of another tool.

In another embodiment, a tool head 325 can be provided with two tool implements on it as shown in FIG. 30. For example, a tool 327 can be provided with a handle 329 and a tool head 325 on the handle. The tool head 325 can have a base 331 that attaches to the handle 329 and a plate 333 at the free end of the base 331 that extends transverse to the handle 329. The plate 333 is generally rectangular in shape and has a tool implement on each long side. One long side 335 tapers to a scraping edge 336 to provide one tool implement. The scraping edge can be used for scraping ice off a car window. The opposite long side 337 of the plate 333 is formed to have angular, pointed, teeth 339 each of which can also be tapered. The teeth 339 form a second tool implement used to cut into ice to loosen it so it can then be scraped off with the other side 335 of the blade 333.

Figures 31, 33:
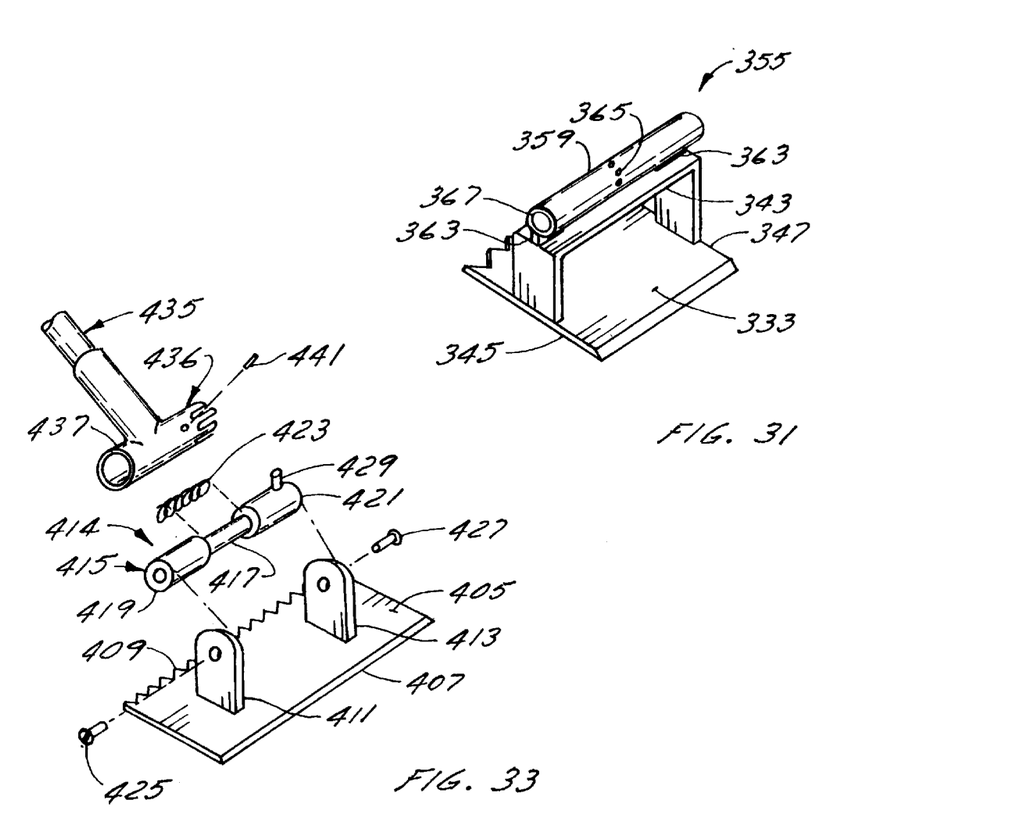
FIG. 31 is a perspective view of a modified tool head.
FIG. 33 is an exploded perspective view of the tool shown in FIG. 32.

Preferably, this tool head 325 is provided with connector means 355, similar to the connector means 55 shown in FIG. 3, for detachably connecting the tool head to a handle 1 of the type shown in FIG. 1. As shown in FIG. 31, the tool head 325 can have a u-shaped bar 343 fixed at its ends to the short sides 345, 347 of the tool plate 333. The connector means 355 has a tubular member 359 attached to the top of the unshaped bar 343 by short arms 363. The tubular member 359 has a series of holes 365 through its wall 367. When used with handle 1, the tool head 325 can be used at different angles to the handle.

In another embodiment of the invention, a tool 401 is provided, as shown in FIGS. 32 to 35, having a tool head 403 somewhat similar to the tool head 325. The tool head 403 has a rectangular plate 405 with a straight, beveled, scraping edge 407 on one side and a toothed, beveled cutting edge 409 on the opposite side. A pair of spaced apart brackets 411, 413 extend transversely from the top of the plate 405 adjacent the other two sides of the plate. Connector means 414, in the form of a cylindrical mounting member 415 is fixedly mounted between the brackets 411, 413. The mounting member 415 has a reduced diameter central portion 417 between its ends 419, 421. A spring 423 is mounted on the central portion 417. The mounting member 415 is fixedly mounted between the brackets 411, 413 with fasteners 425, 427 extending through the brackets and into the ends 419, 421 of the member 415. There is a short, radially extending stop pin 429 on the member 415 adjacent one end 421.

The tool has a handle 435 with a connecting means 436 at one end in the form of a transverse sleeve 437. The sleeve 437 is sized to be snugly, rotatably, mounted on the mounting member 415. The sleeve 437 fits snugly over the mounting member 415 covering the spring 423 on the central portion 417 of the member 415. The sleeve 437 is shorter than the 415 and has longitudinal extending cutouts 439 extending inwardly from one of its ends 440. The cutouts 439 are spaced apart circumferentially about the sleeve 437 and each is about three times wider than the diameter of the stop pin 429. A spring pin 441 extends radially inwardly from the wall 443 of the sleeve 437 into the central portion 417 of the member 415.

Figure 34A:
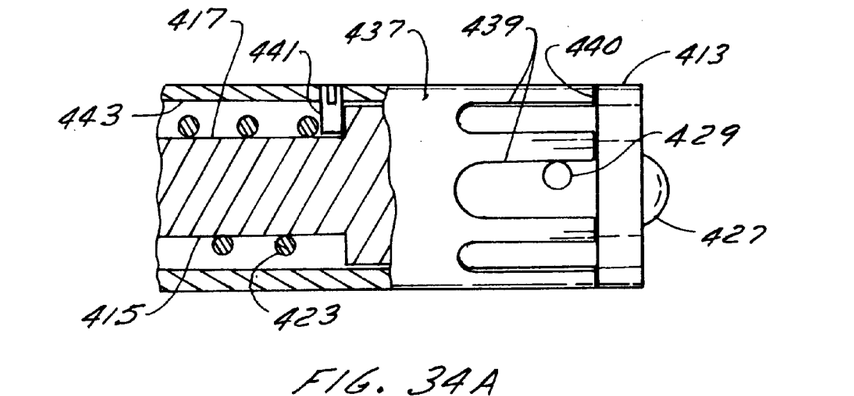
FIG. 34A is a detail view of the tool shown partly in section with the sleeve on the tool handle biased to receive the locking pin.
Figure 34B:
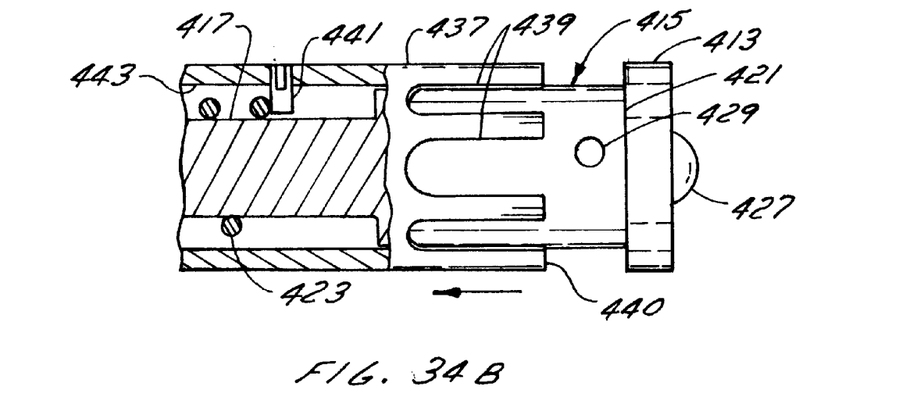
FIG. 34B is a view similar to FIG. 34A but with the sleeve moved away from the locking pin allowing adjustment of the housing.

The sleeve 437 is assembled onto the member 415 to have the spring pin 441 and thus the sleeve 437 biased by the spring 423 toward the end 421 of the member 415. The locking pin 429 on the member 415 enters one of the cutouts 439 on the sleeve 437 as the sleeve is biased toward the pin. The locking pin locks the handle 435 in a selected radial position relative to the mounting member 415 and thus the plate 405. The radial position of the handle 435 relative to the plate 405 can be changed by sliding the sleeve 437 carrying the handle 435 away from the locking pin 429 to move the pin out of the cutouts 439. As the sleeve slides away, the spring pin 441 carried by it compresses the spring 423. The handle can then be rotated to a new radial position and slid back to position the locking pin 429 in a different cutout 439 to lock the handle 435 in the new position.

Figure 35:
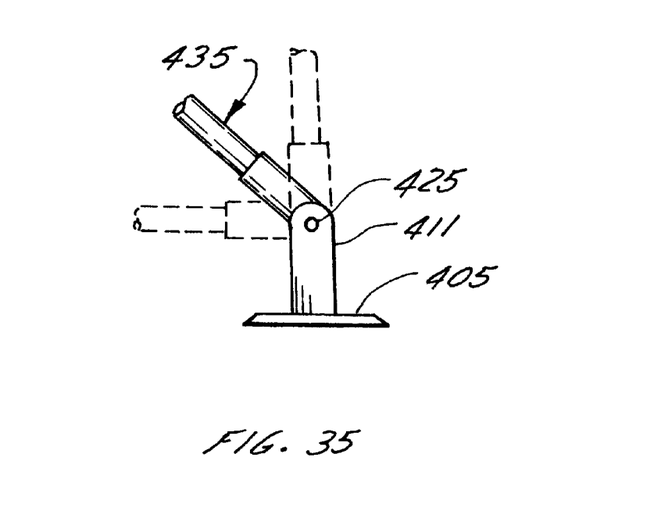
FIG. 35 is an end view showing the various positions of the handle of the tool shown in FIG. 32.

The handle 435 has slight limited rotational movement about the mounting member 415, even with the locking pin 429 located in a cutout 439 in the sleeve 437. This is because the cutouts 439 are wider than the locking pin 429. This limited rotational movement allows the tool head 403 to rotate back and forth, relative to the tool handle, a limited amount during use, the tool head rocking in the direction the handle is moved. This rocking movement of the tool head helps loosen the material being scraped by the tool. The tool is particularly adapted for cleaning ice off sidewalks or walkways but can also be used for other functions such as for example for removing shingles off roofs. The tool could also be miniaturized to be used as an ice and snow scraper for car windshields.

While the cutouts 439 in the sleeve 437 have been made wider than the diameter of the stop pin 429 to provide for rocking movement, they could also be made narrower to prevent the rocking movement. In this arrangement, the pin 429 enters a cutout 439 and locks the handle in place without movement.

The tool handle, with connecting means thereon, has been described as being used in conjunction with a tool head. However, the handle could also be used as a manipulating handle on a vehicle such as a wagon or a wheelbarrow provided that these vehicles are equipped with connector means for detachably receiving the handles. The detachable handles can save storage space for the vehicles.

The connector means 414 employing the cylindrical mounting member 415 and the connecting means 439 in the form of the sleeve 437 could be used to rotatably connect members other than a handle and a tool head, or a handle and a vehicle, together. A first, fixed member could carry the sleeve 437 and a second movable member could be fixed to the mounting member 415. The second movable member could be radially moved relative to the first fixed member using the connector means 414. An example of using the connector means 414 in other environments could be in a bicycle where the sleeve 437 could be mounted on the steering post of a bicycle frame and the cylindrical mounting member 415 could form the central part of the handlebars on the bicycle. The radial position of the handlebars could be adjusted relative to the steering post, using the above mounting, by moving the handlebars laterally, against the pressure of the spring 423, to move the pin 429 out of a notch 439 on the fixed sleeve 437, rotating the handlebars to the desired position and then allowing the spring 423 to move the handlebars back laterally thus moving the pin 429 back into a new slot 439 to fix the handlebar in the new radial position. In this arrangement, the slots 439 snugly receive the pin 429. The connector means 414 could be used in other situations where radial adjustment of one member, relative to another, is required.

The tools and tool parts can be sold in various forms of kits. For example, a gardening kit could be provided having a short handle 1 with a grip and a long handle 1' with no grip, and various gardening tool heads such as a garden rake, a hoe, various shovels and a leaf rake. Another kit could be a shovel kit with a single, short handle and various shovel tool heads such as a pointed blade, a square blade, a lawn edging blade, a fork blade, a snow blade, etc.. Another kit could be a winter kit having a long and short handle, an auxiliary handle, a snow shovel tool head, a snow scoop tool head with an end wall attachment and a plow forming attachment, an ice breaking tool head, an adjustable angle handle fitting, etc.

Figure 36:
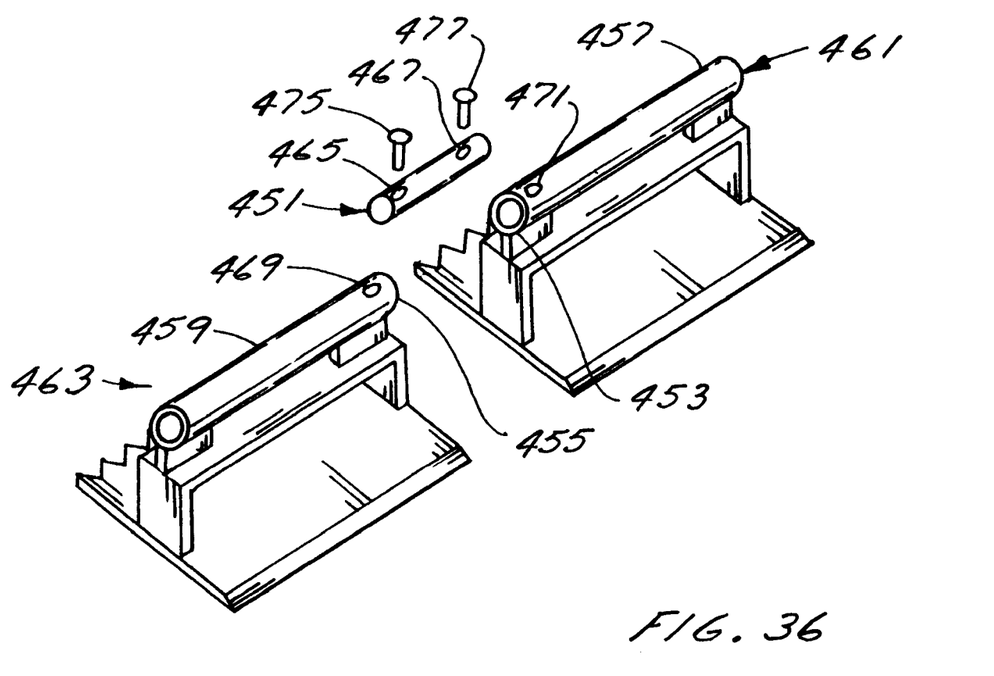
FIG. 36 is an exploded, perspective view of two tool heads joined side-by-side.

Any of the tool heads described, having connector means with a tubular member, such as tubular member 359 in the tool head 325 shown in FIG. 31, can be joined side-by-side with identical tool heads with connector plugs 451 as shown in FIG. 36. The connector plug 451 slips into the open ends 453, 455 of adjacent tubular members 457, 459 on adjacent tool heads 461, 463. The plug 451 has diametrical through holes 465, 467 adjacent its ends. These holes 465, 467 are aligned with holes 469, 471 in the tubular members 457, 459 adjacent their ends when the plug is inserted in the tubular members. Bolts 475, 477 pass through the aligned holes 465, 469 and 467, 471 in the tubular members and the plug to join the plug to the heads to connect the heads together. A tool head such as tool head 325 can be joined in end-to-end abutting relationship to another tool head 325 with a connecting plug to provide a wider tool. Such a wider tool could be used with additional handles, such as handles 171 or 171', to make the wider tool more effective.

I claim:

1. A connector means for allowing radial adjustment of one member relative to a second member; the connector means comprising a tubular member on one member, a cylindrical mounting member on the second member, the tubular member mounted on the cylindrical mounting member and longitudinally movable relative to the mounting member between first and second positions, cooperating means on the tubular member and the mounting member making the tubular member non-rotatable relative to the mounting member in the first position and rotatable relative to the mounting member in the second position, the cooperating means including a set of short longitudinal slots extending inwardly from one end of the tubular member, the slots spaced apart in the circumferential direction of the tubular member, and a radial pin on the mounting member, the pin received by one of the slots to fix the angle of the tubular member relative to the mounting member in the first position.

2. A connector means for allowing radial adjustment of one member relative to a second member; the connector means comprising a tubular member on one member, a cylindrical mounting member on the second member, the tubular member mounted on the cylindrical mounting member and longitudinally movable relative to the mounting member between first and second positions, cooperating means on the tubular member and the mounting member making the tubular member non-rotatable relative to the mounting member in the first position and rotatable relative to the mounting member in the second position, the cooperating means including a set of short longitudinal slots extending inwardly from one end of the tubular member, the slots spaced apart in the circumferential direction of the tubular member, and a radial pin on the mounting member, the pin received by one of the slots to fix the angle of the tubular member relative to the mounting member in the first position, and including spring means biasing the tubular member to the first position relative to the mounting member.

* * * * *